US010444032B2

(12) United States Patent
Takahashi

(10) Patent No.: US 10,444,032 B2
(45) Date of Patent: Oct. 15, 2019

(54) SENSOR OUTPUT CHANGE DETECTION

(71) Applicant: International Business Machines Corporation, Armonk, NY (US)

(72) Inventor: Toshihiro Takahashi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 15/610,066

(22) Filed: May 31, 2017

(65) Prior Publication Data

US 2017/0261339 A1    Sep. 14, 2017

Related U.S. Application Data

(63) Continuation of application No. 14/690,613, filed on Apr. 20, 2015, now Pat. No. 9,702,729.

(30) Foreign Application Priority Data

Apr. 30, 2014    (JP) .................................. 2014-093416

(51) Int. Cl.
*G01D 3/08*        (2006.01)
*G06F 17/18*       (2006.01)
(Continued)

(52) U.S. Cl.
CPC ............. *G01D 3/08* (2013.01); *G06F 16/221* (2019.01); *G06F 16/2365* (2019.01);
(Continued)

(58) Field of Classification Search
CPC ..... G01D 3/08; G06F 17/30315; G06F 17/18; G06F 17/30371; G06K 9/00496; G06K 9/6243; G06K 2009/00583
See application file for complete search history.

(56) References Cited

U.S. PATENT DOCUMENTS

2008/0253665 A1* 10/2008 Mitarai ................ G06K 9/6252
                                                                382/227
2015/0317284 A1    11/2015 Takahashi

FOREIGN PATENT DOCUMENTS

JP          7280603 A    10/1995
JP       2008058191 A     3/2008
                    (Continued)

OTHER PUBLICATIONS

Jiang et al., "Anomaly Localization by Joint Sparse PCA and Its Implementation in Sensor Network", SensorKDD'10, Jul. 25, 2010, (Year: 2010).*

(Continued)

*Primary Examiner* — Regis J Betsch
(74) *Attorney, Agent, or Firm* — Stosch Sabo

(57) ABSTRACT

A method includes acquiring a first data column output from a plurality of sensors, generating a model for estimating data from the plurality of sensors on the basis of the first data column, acquiring a second data column output from the plurality of sensors, obtaining an estimated data column corresponding to the second data column based on the model by using regularization for making an error between the second data column and the estimated data column sparse, and identifying a sensor in which a change occurred between the first data column and the second data column on the basis of the error between the second data column and the estimated data column. A corresponding computer program product and apparatus are also disclosed herein.

20 Claims, 8 Drawing Sheets

(51) Int. Cl.
G06F 16/22 (2019.01)
G06F 16/23 (2019.01)
G06K 9/00 (2006.01)
G06K 9/62 (2006.01)

(52) U.S. Cl.
CPC ......... G06F 17/18 (2013.01); G06K 9/00496 (2013.01); G06K 9/6243 (2013.01); *G06K 2009/00583* (2013.01)

(56) References Cited

FOREIGN PATENT DOCUMENTS

| | | |
|---|---|---|
| JP | 2008198213 A | 8/2008 |
| JP | 2009076056 A | 4/2009 |
| JP | 2010078467 A | 4/2010 |
| JP | 4528355 B2 | 8/2010 |
| JP | 2013257251 A | 12/2013 |
| WO | 2008114863 A1 | 9/2008 |

OTHER PUBLICATIONS

Francis Bach, "Sparse methods for machine learning" 2010, CVPR Tutorial Jun. 2010; http://www.di.ens.fr/~fbach/Cours_peyresq_2010.pdf (Year: 2010).*

Lu et al., "People Tracking with the Laplacian Eigenmaps Latent Variable Model", 2007, Advances in Neural Information Processing Systems 20 (NIPS 2007) (Year: 2007).*

IDE, "Change-point detection and failure analysis of sensor data using sparse structure learning", IBM Professionals Paper, Mar. 18, 2010. ProVISION No. 65 / Spring 2010. 4 pages.

Inui, et al., "Comparison of Anomaly Detection of Methods Using Dimensionality Reduction and Reconstruction Error", The 23rd Annual Conference of the Japanese Society for Artificial Intelligence, 2009. 4 pages.

Jiang et al., "Anomaly Localization by Joint Sparse PCA and it's Implementation in Sensor Network", Sensor KDD'10, Jul. 2010, Washington, DC. 8 pages.

Bach, "Sparse methods for machine learning", CVPR Tutorial, Jun. 2010. 57 pages.

Lu et al., "People Tracking with the Laplacian Eigenmaps Latent Variable Model", 2007, Advances in Neural Information Processing Systems 20 (NIPS 2007). 10 pages.

Goldberg et al., "Dissimilarity in Graph-Based Semi-Supervised Classification", Proceedings of the Eleventh International Conference on Artificial Intelligence and Statistics (AISTATS-07), 2007, pp. 1-8.

Yuan, Ming, "Model selection and estimation in the Gaussian graphical model", Received Jan. 1, 2006, Revision received Aug. 1, 2006, pp. 19-35. Biometrika (2007) 94 (1): 19-35. doi 10.1093/biomet/asm018, first published online: Feb. 28, 2007. Copyright 2007 Biometrika Trust.

Zhu et al., "Combining Active Learning and Semi-Supervised Learning Using Gaussian Fields and Harmonic Functions", Proceedings of the ICML-2003 Workshop on the Continuum from Labeled to Unlabeled Data, Washington DC, 2003, pp. 1-8.

"Anamoly Detection Method, Program, and System", Japanese Patent Application No. 2012-134319, pp. 1-24, filed Jun. 14, 2012.

"Anomaly Detection Method, Program and System" U.S. Appl. No. 13/916,744, filed Jun. 13, 2013, pp. 1-22.

"Detecting Device, Detecting Method, and Program", Japanese Patent Application 2013-184558, pp. 1-35, filed on Sep. 6, 2013.

"Detecting Device, Detecting Method, and Program", National Phase Application No. JP2014/072734, filed Aug. 29, 2014. pp. 1-36.

Takahashi, "Detection Device, Detection Method, and Program", Japanese Patent Application 2014-093416, pp. 1-49, filed on Apr. 30, 2014.

IBM List of Patents or Patent Applications Treated as Related, May 30, 2017. 2 pages.

* cited by examiner $$\operatorname*{argmin}_{X} \operatorname{tr}(XLX^T) \text{ subject to } XDX^T = 1, XD\vec{1} = \vec{0}$$

$$X \equiv (\vec{x}_1, ..., \vec{x}_N) \in \vec{R}^{Q \times N}$$

FIG. 1B $$L \equiv D - W$$

$$w_{n,m} \equiv \exp\left((-1/\sigma^2)\|\vec{y}_n - \vec{y}_m\|^2\right)$$

$$D \equiv \operatorname{diag}(\{\sum_m w_{n,m}\}_{n=1}^{N})$$

FIG. 1C $$p(\vec{\chi}_m, \vec{v}_m | \vec{\eta}_m, \vec{y}_n) = (\Sigma_n w_{n*}/2\pi)^{1/2} \exp[((-1/2)\Sigma_n w_{n*}) \|\vec{x}_n - \vec{\chi}_m\|^2]$$
$$\times (\Sigma_n k_{n*}/2\pi)^{1/2} \exp[((-1/2)\Sigma_n k_{n*}) \|\vec{y}_n - \vec{v}_m\|^2]$$

$$w_{n*} \equiv \exp((-1/\sigma_y^2)\|\vec{y}_n - \vec{n}_m\|^2)$$
$$k_{n*} \equiv \exp((-1/\sigma_y^2)\|\vec{x}_n - \vec{\chi}_m\|^2)$$

FIG. 1D $$(\{\vec{\chi}_m'\}, \{\vec{v}_m'\}) = \underset{\vec{\chi}_m, \vec{v}_m}{argmin}[-\sum_m \log p\ (\vec{\chi}_m, \vec{v}_m | \vec{\eta}_m, \vec{y}_n)$$
$$-\log p\ (\vec{v}_1, ..., \vec{v}_M | \vec{\eta}_1, ..., \vec{\eta}_M)]$$

FIG. 1E $$-\log p\ (\vec{v}_1, ..., \vec{v}_M | \vec{\eta}_1, ..., \vec{\eta}_M) = \lambda_1 \sum_d \sqrt{\sum_m \|v_{md} - h_{md}\|^2}$$
$$+ \lambda_2 \sum_m \|\vec{v}_m - \vec{v}_{m-1}\|_{1,1}$$

FIG. 1F $$S_{n,d} = |\eta_{md} - v_{nd}'|$$

FIG. 1G

SENSOR OUTPUT CHANGE DETECTION

BACKGROUND OF THE INVENTION

The present invention relates generally to the field of data processing and more particularly to processing sensor data.

Sensors may be provided on a complicated system such as an automobile or a manufacturing device. Time series data acquired from the sensors may be analyzed. Particularly, time series data may be analyzed to monitor the presence or absence of abnormalities even in systems with hundreds of sensors.

SUMMARY

An apparatus includes a first acquisition unit which acquires a first data column output from a plurality of sensors, a generation unit which generates a model for estimating data from the plurality of sensors on the basis of the first data column, a second acquisition unit which acquires a second data column output from the plurality of sensors, an estimation unit which obtains an estimated data column corresponding to the second data column based on the model by using regularization for making an error between the second data column and the estimated data column sparse, and an identification unit which identifies a sensor in which a change occurred between the first data column and the second data column on the basis of the error between the second data column and the estimated data column.

A method includes acquiring a first data column output from a plurality of sensors, generating a model for estimating data from the plurality of sensors on the basis of the first data column, acquiring a second data column output from the plurality of sensors, obtaining an estimated data column corresponding to the second data column based on the model by using regularization for making an error between the second data column and the estimated data column sparse, and identifying a sensor in which a change occurred between the first data column and the second data column on the basis of the error between the second data column and the estimated data column. A corresponding computer program product and apparatus are also disclosed herein.

The foregoing summary of the invention is not a list of features required for the present invention. In addition, any sub-combination of these features could also constitute the invention.

BRIEF DESCRIPTION OF THE DRAWINGS

FIGS. 1B-1G are equation diagrams in accordance with at least one embodiment of the present invention;

DETAILED DESCRIPTION

Hereinafter, the present invention will be described in various embodiments. It should be noted, however, that the following embodiments are not intended to limit the scope of the appended claims, and that not all the combinations of features described in the embodiments are necessarily required by the present invention.

The abnormality degrees of sensors may be scored for identification on the basis of the degree of change in the structure of a relation between the sensors with respect to a sensor group (normal sensors) which shows a detection result in which an input signal is within a normal signal range and a sensor group (abnormal sensors) which shows a detection result in which an input signal is within an abnormal signal range from a plurality of time series data. In the case where, for example, there are a hundred or more of sensors mutually having a complicated correlation in a physical system, however, it is difficult to pick up only abnormal sensors and sensors having a strong correlation with an abnormal sensor also have high scores of abnormality in some cases.

Figure 1A:
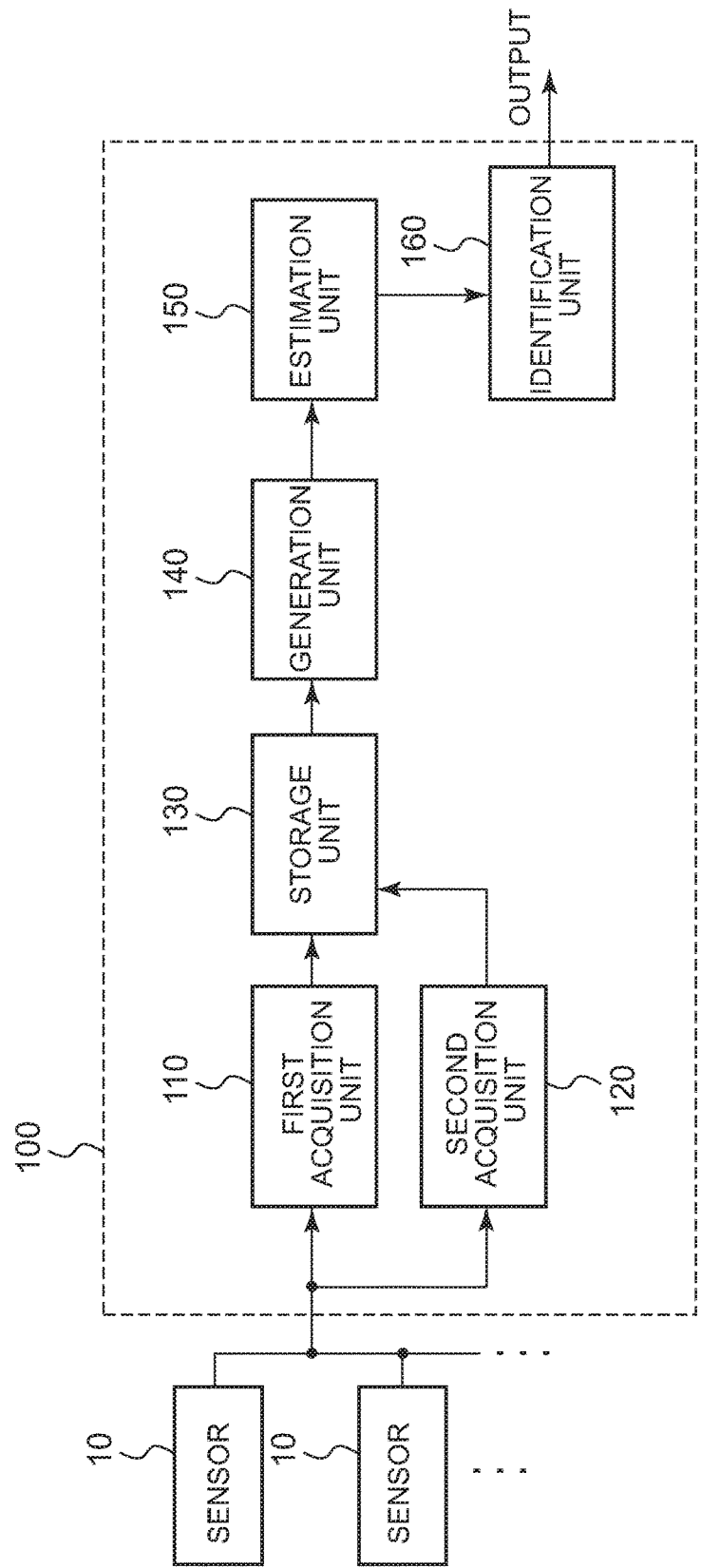
FIG. 1A is a block diagram illustrating a configuration example of a detection device operably coupled to a plurality of sensors in accordance with at least one embodiment of the present invention.

FIG. 1A illustrates a configuration example of a detection device 100 according to an embodiment along with a plurality of sensors 10. The plurality of sensors 10 may be mounted on an object such as an automobile, a ship, an aircraft, or other transport machinery, a manufacturing device, or a monitoring device and transmit detection results to the detection device 100. The sensor 10 may be connected to the detection device 100 by wired communication or alternatively may be connected to the detection device 100 by wireless communication. This embodiment will be described by giving an example in which the object is an automobile.

The sensor 10 may be, for example, a temperature sensor for engine cooling water, a temperature sensor for engine intake air, an oil temperature sensor, an intake pipe internal pressure sensor for a fuel injection device, a supercharging pressure sensor for a turbocharger, a throttle position sensor, a steering angle sensor, a vehicle height sensor, a liquid level sensor, a rotation speed sensor, a knock sensor, an acceleration sensor, an angular velocity sensor, a geomagnetic sensor, a flow sensor, an oxygen sensor, a lean air-fuel ratio sensor, or the like. In some cases, several hundred to one thousand or more sensors 10 are provided at a time.

In this case, it is necessary to process several hundred to one thousand or more arrays of time series data. Regarding the time series data of the sensors provided on the automobile and the like, data values themselves and the structure of a relation between the sensors dynamically change and the dynamic change may abruptly occur and may not be foreseeable in advance. As an example, in the case where a car is "accelerated" by an action of "treading on an accelerator," the structure of a relation between the sensors is strengthened with respect to the outputs from the throttle position sensor, the rotation speed sensor, and the acceleration sensor. Specifically, the structure of the relation between the sensors dynamically changes at an unpredictable time (for example, regarding a user's operation, a situation of the automobile, or the like) and therefore the sensors may have a mutually-complicated correlation.

Moreover, in this case, a detected output at each sensor and a range of values for determining that the detected output is in the normal state vary according to the situation of the automobile such as passengers (a loading amount of baggage or the like), the current speed, the road gradient during traveling, whether the automobile is traveling on a straight road or on a curved road (in the case of a curved road, the degree of curvature), or the like. Specifically, an output of each sensor and criteria for judgment of whether the situation of the automobile is normal dynamically change at an unpredictable time (for example, regarding a user's operation, a situation of the automobile, or the like).

In this manner, even in the case of time-series signals from the same sensor, data values and the criteria for judgment significantly change in response to a change in the structure of a relation with other sensors and therefore it is difficult to perform meaningful processing even if data is compared with past data. In this case, it is conceivable to treat the sensors as multivariable systems for analysis. The calculation amount, however, increases in an exponential manner as the number of sensors increases. Therefore, this approach is distant when using several hundred to one thousand or more sensors.

Moreover, there can also be an idea of estimating the degree of change in the structure of the relation between the sensors and scoring the abnormality degrees of the sensors according to the estimation result. In this case, it is possible to discriminate a normal sensor from an abnormal sensor by comparing the scored abnormality degree with a predetermined threshold value or the like. When this type of discrimination method is used, however, not only the score of an abnormal sensor, but also the score of a normal sensor having a strong correlation with the abnormal sensor is also calculated as a great value enough to show abnormality in some cases, in the case of scoring the abnormality degrees of the sensors mutually having a complicated correlation.

Accordingly, the detection device 100 according to this embodiment is a detection device which detects a change in outputs from a plurality of sensors, wherein learning data is used to generate a model for mapping output data from the plurality of sensors 10 to a low-dimensional latent space and then reconstructing the output data in the original dimensions. Furthermore, in the case of using the model to map test data to a latent space and to reconstruct the test data in the original dimensions, the detection device 100 performs regularization so as to enlarge a change of data which behaves abnormally, thereby increasing the score of the abnormal sensor in comparison with the normal sensors. The detection device 100 includes a first acquisition unit 110, a second acquisition unit 120, a storage unit 130, a generation unit 140, an estimation unit 150, and an identification unit 160.

The first acquisition unit 110 acquires a first data column output from the plurality of sensors 10. The first acquisition unit 110 acquires the first data column as learning data. Moreover, the first acquisition unit 110 may acquire a first data column stored in the detection device 100 or an external storage device. Furthermore, the first acquisition unit 110 may acquire a first data column supplied by an external device connected to the plurality of sensors 10.

The first acquisition unit 110 preferably acquires outputs from the plurality of sensors 10 in a state where the outputs represent a normal behavior of the automobile which is a measuring object as a first data column for learning. Alternatively, the first acquisition unit 110 may acquire a supposed data column as the first data column from a prediction model for generating a data column supposed to be output from the plurality of sensors 10, a model for a device to be measured, or the like.

This embodiment will be described by giving an example that the first acquisition unit 110 acquires a first data column corresponding to first outputs output in time series by the plurality of sensors 10 when the automobile, which is an object equipped with the plurality of sensors 10, is in a normal state. The first acquisition unit 110 supplies the acquired first data column to the storage unit 130.

The second acquisition unit 120 acquires a second data column output from the plurality of sensors 10. The second acquisition unit 120 acquires the second data column as test data. Moreover, the second acquisition unit 120 may acquire a second data column stored in the detection device 100 or an external storage device. Furthermore, the second acquisition unit 120 may acquire a second data column supplied by an external device connected to the plurality of sensors 10.

The second acquisition unit 120 acquires a second data column detected from the automobile which is a measuring object. For example, the second acquisition unit 120 acquires outputs in a predetermined period, which is different from the period in which the first acquisition unit 110 acquires the first data column, as a second data column.

In this case, the second acquisition unit 120 preferably acquires data, which is output in time series from the plurality of sensors 10, as a second data column in the case where the automobile is operating. This embodiment will be described by giving an example that the second acquisition unit 120 acquires a second data column corresponding to second outputs output in time series from the plurality of sensors 10 in the case where the automobile equipped with the plurality of sensors 10 is in the operating state. The second acquisition unit 120 may supply the acquired second data column to the storage unit 130.

The storage unit 130, which is connected to the first acquisition unit 110 and to the second acquisition unit 120, stores the first data column and the second data column which have been received. Moreover, the storage unit 130 may store data generated by the detection device 100 and intermediate data processed in the course of generating the data or the like. Furthermore, the storage unit 130 may supply stored data to a requestor in response to a request from each unit in the detection device 100.

The generation unit 140, which is connected to the storage unit 130, generates a model for estimating data from the plurality of sensors 10 on the basis of the first data column. The generation unit 140 generates a model known as a latent variable model, as a probability model which represents the operation of the plurality of sensors 10. The generation unit 140 calculates a first latent data column, which is a latent variable data column, from the first data column on the basis of the latent variable model. In the above, the latent variable is not a directly-observed variable (physical quantity), but a variable indirectly estimated through a variation pattern of various data. The latent variable is used for purpose of representing a state or the like behind a sampled physical quantity and is a variable known in the probability model.

For each data output from the plurality of sensors 10, the generation unit 140 generates a model which represents a probability distribution of latent data corresponding to the data concerned and of estimated data obtained from the latent data. The generation unit 140 generates a probability model for generating the estimated data obtained by estimating outputs from the plurality of sensors 10 after reconstruction from the latent data. The generation unit 140 may supply the generated probability model to the storage unit 130.

The estimation unit 150 estimates an estimated data column corresponding to the second data column based on the model generated by the generation unit 140 by using regularization in which an error between the second data column and the estimated data column is made sparse. Note here that the term "sparse" means a matrix state in which nonzero components are very few, in other words, in which most components are zero. Therefore, the estimation unit 150 adds a regularization term to a model generated by the generation unit 140 so that most of the components of a difference between the second data column and the estimated data column are zero.

The identification unit 160 identifies a sensor where a change occurred between the first data column and the second data column on the basis of an error between the second data column and the estimated data column. The identification unit 160 identifies, for example, the sensor 10 corresponding to a nonzero component in a difference between the second data column and the estimated data column as a sensor where a change occurred.

Moreover, the identification unit 160 may identify a sensor in which abnormality is detected on the basis of an error between the second data column and the estimated data column. The identification unit 160 may identify the sensor 10 corresponding to the nonzero component as an abnormal sensor in the difference between the second data column and the estimated data column. Alternatively, the identification unit 160 may identify the sensor 10 corresponding to a component having a value equal to or greater than a predetermined value among the nonzero components as an abnormal sensor.

The detection device 100 according to this embodiment identifies an abnormal sensor by generating a probability model based on the first data column output from the plurality of sensors 10 and obtaining estimated data by adding a regularization term in which an error between the second data column and the estimated data based on the second data column is made sparse to the model. The operation of the detection device 100 will be described by using FIG. 2.

Figure 2:
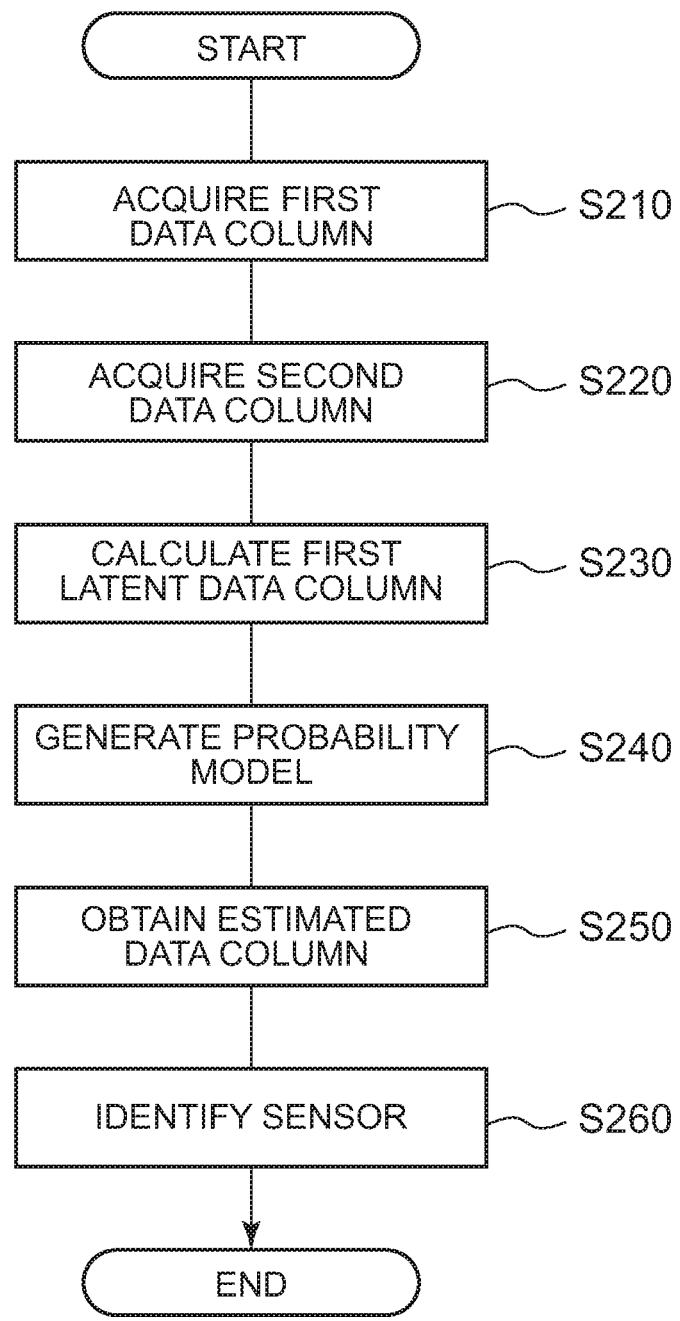
FIG. 2 is a flowchart illustrating one embodiment of an operation flow in accordance with at least one embodiment of the detection device.

FIG. 2 illustrates an operation flow of the detection device 100 according to this embodiment. The detection device 100 performs the operation flow to identify a small number of abnormal sensors among the plurality of sensors 10 accurately.

First, the first acquisition unit 110 acquires a first data column (S210). For example, when the number of the plurality of sensors 10 is D, the first acquisition unit 110 acquires data of N×D columns per row as a first data column $y_n$ (n=1, 2, . . . , N), where $y_n$ is a vector having D elements and a data column represented in D dimensions. The first acquisition unit 110 may receive the vector of the first data column in an array format. Moreover, the storage unit 130 may store the vector of the first data column in an array format.

Subsequently, the second acquisition unit 120 acquires a second data column (S220). The second acquisition unit 120 acquires, for example, data of M×N columns per row as a second data column $\eta_m$ (m=1, 2, . . . , M), where $\eta_m$ is a vector having D elements and a data column represented in D dimensions.

Subsequently, the generation unit 140 calculates a first latent data column which is a latent variable data column mapped from the first data column $y_n$ to the latent space on the basis of a latent variable model (S230), where the generation unit 140 is allowed to use a known model such as, for example, the graphical Gaussian model (Graphical LASSO), probabilistic PCA (Principal Component Analysis), probabilistic kernel PCA, or Gaussian process latent variable model, as the latent variable model.

The following describes an example that the generation unit 140 of this embodiment uses a known model as a Laplacian eigenmap latent variable model. The generation unit 140 calculates a first latent data column $x_n$ by minimizing the expression of FIG. 1B on the basis of the depicted model.

In the expression of FIG. 1B, "argmin f(x)" indicates x in the case where f(x) is minimum, "tr" indicates the sum of diagonal elements (trace), and "subject to g(z)" indicates the meaning of "under the constraint condition g(z)." Moreover, a vector I indicates a unit matrix ($a_{ij}=1$ (i=j), $a_{ij}=0$ (i≠j)) and a vector 1 indicates a row vector in which all elements are 1.

Moreover, the generation unit 140 calculates the first latent data column $x_n$ as a predetermined Q-dimensional data column lower in dimensions than the D dimensions. For example, the generation unit 140 calculates the first latent data column $x_n$ in low dimensions such as three or four dimensions and shows the behaviors of the plurality of sensors 10 in the corresponding three- or four-dimensional latent space. In FIG. 1B, the matrices L and D are represented by the expressions shown in FIG. 1C.

In the expressions shown in FIG. 1C, $w_{n,m}$ is an element of W and "diag(x)" indicates a diagonal matrix. Moreover, σ is a predetermined parameter. For example, when σ increases, the value of $w_{n,m}$, which is an element of the matrix W, approaches zero unless a difference between $y_n$ and $y_m$ increase in response to σ. Moreover, when σ decreases, the value of $w_{n,m}$, which is an element of the matrix W, increases unless the difference between $y_n$ and $y_m$ decrease in response to σ. Specifically, σ serves as a parameter which determines to what extent the difference between $y_n$ and $y_m$ is reflected on the matrix W.

Subsequently, the generation unit 140 generates a model representing a probability distribution of the second latent data column $x_m$ and estimated data obtained from the second latent data on the basis of the first data column $y_n$, the first latent data column $x_n$, and the second data column $\eta_m$ (S240). The generation unit 140 generates a joint probability density function $p(\chi_m, v_m | \eta_m, y_n)$ of $\chi_m$ and $v_m$ as represented by the expression shown in FIG. 1D, where $v_m$ is the estimated data obtained from the second latent data column $\chi_m$.

In the expressions shown in FIG. 1D, σx and σy are predetermined parameters similarly to σ in FIG. 1C. The expressions of FIG. 1D are represented by terms of the norm of $x_n$ and $\chi_m$, the norm of $y_n$ and vm, and the norm of $y_n$ and $\eta_m$, except constants and parameters σx and σy. Specifically, the generation unit 140 generates a model representing a probability distribution where the probability decreases as the difference between the latent data in the second latent data column $\chi_m$ and each latent data of the first latent data column $x_n$ increases, the probability decreases as the difference between the estimated data in the estimated data column $v_m$ and each data of the first data column $y_n$ increases, and the probability decreases as the difference between data in the second data column $\eta_m$ and each data of the first data column $y_n$ increases. In this manner, the generation unit 140 generates a model in which the joint probability density function p of $x_m$ and $v_m$ increases as the values of respective data of $x_n$ and $\chi_m$, $y_m$ and $v_m$, and $y_n$ and $\eta_m$ approach each other.

The estimation unit 150 estimates an estimated data column by reconstruction with sparse regularization on the basis of test data which is an observed value in the known latent variable model as described above (S250). For example, the estimation unit 150 calculates the estimated data column $v_m$ by using regularization in which an error between the second data column $\eta_m$ and the estimated data column $v_m$ is concentrated on a data column obtained from particular sensors 10.

Specifically, the estimation unit 150 calculates the estimated data column $v_m$ by using a regularization term in which the probability decreases as the difference between data in the second data column $\eta_m$ and estimated data in the estimated data column $v_m$ increases. The estimation unit 150 optimizes the joint probability density function p by using the regularization term as described above and calculates the estimated data column $v_m$ corresponding to the second latent data column $\chi_m$, thereby reconstructing a data column substantially coincident with the second data column $\eta_m$.

Note here that the second data column $\eta_m$ is a data column acquired when most sensors 10 normally operate and therefore the estimated data column $v_m$ obtained by the estimation unit 150 substantially coincides with an output data column indicating the behavior of the normal sensor in the N-dimensional superspace. Therefore, the estimation unit 150 calculates the estimated data column $v_m$ so that the data corresponding to an abnormal sensor indicates the behavior different from the behavior of data corresponding to the normal sensor among the data estimated from the second data column $\eta_m$ (in other words, so that the error is large).

Moreover, the estimation unit 150 may calculate the estimated data column by using regularization in which the error between the second data column $\eta_m$ and the estimated data column $v_m$ is concentrated in the time direction with respect to the respective sensors. For example, the estimation unit 150 calculates the estimated data column by using a regularization term in which the probability decreases as the difference between the estimated data in the estimated data column $v_m$ and the estimated data in the estimated data column $v_{m-1}$ which has been estimated before increases. The estimation unit 150 calculates the estimated data column $v_m$ by using the regularization term as described above, thereby reconstructing a data column substantially coincident with the estimated data column $v_{m-1}$ which has been estimated before.

Note here that the second data column $\eta_m$ is a data column acquired when most sensors 10 operate normally and therefore the estimated data column $v_m$ obtained by the estimation unit 150 substantially coincides with output data indicating the behavior of the sensor 10 which operates normally in a temporally stable manner among data of the estimated data column $v_{m-1}$ which has been estimated before. Therefore, the estimation unit 150 calculates the estimated data column $v_m$ so that the data corresponding to an abnormal sensor indicates the behavior different from the behavior of data corresponding to the normal sensor in comparison with the estimated data column $v_{m-1}$ which has been estimated before (in other words, so that the error is large).

Moreover, the estimation unit 150 may calculate the estimated data column by using regularization in which the error between the second data column $\eta_m$ and the estimated data column $v_m$ is concentrated on a data column obtained from particular sensors 10 and the error between the second data column $\eta_m$ and the estimated data column $v_m$ is concentrated in the time direction with respect to the respective sensors. Specifically, the estimation unit 150 calculates the estimated data column $v_m$ by using a regularization term in which the probability decreases as the difference between the data in the second data column $\eta_m$ and the estimated data in the estimated data column $v_m$ increases and the probability decreases as the difference between the estimated data in the estimated data column $v_m$ and the estimated data in the estimated data column $v_{m-1}$ which has been estimated before increases.

As described above, the estimation unit 150 calculates the estimated data column $v_m$ by using the term for regularization. More specifically, as represented by the expression of FIG. 1E, the estimation unit 150 estimates the second latent data column and the estimated data column which optimize an objective function including a term in which the probability of taking the value of latent data in the second latent data column $\chi_m$ which is a latent variable data column of the second data column $\eta_m$ and the value of the corresponding estimated data in the estimated data column $v_m$ is summed up with respect to the second data column $\eta_m$ and a term for regularization.

The first term of the right side of FIG. 1E is a term in which the joint probability density function $p(\chi_m, v_m | \eta_m, y_n)$ of $\chi_m$ and $v_m$ illustrated in FIG. 1D is summed up with respect to the second data column $\eta_m$ which is test data. Moreover, the second term is a term for regularization. The estimation unit 150 uses, for example, a regularization term shown in the expression of FIG. 1F as a term for regularization.

The first term in the right side of FIG. 1F is a regularization term in which the probability decreases as the difference between the data in the second data column $\eta_m$ and the estimated data in the estimated data column $v_m$ increases, and the first term is calculated on the basis of the sum of squared values in the respective dimensions. Moreover, the second term is a regularization term in which the probability decreases as the difference between the estimated data in the estimated data column $v_m$ and the estimated data in the estimated data column $v_{m-1}$ which has been estimated before increases, and the second term is calculated on the basis of the sum (L1 norm) of the absolute values of the values in the respective dimensions.

In the above, $\lambda 1$ and $\lambda 2$ are parameters for determining the weight of the regularization term to be used. For example, when $\lambda 1=1$ and $\lambda 2=0$ are assumed, the estimation unit 150 thereby uses the regularization of the first term of FIG. 1F. Moreover, when $\lambda 1=0$ and $\lambda 2=1$ are assumed, the estimation unit 150 thereby uses regularization of the second term. Furthermore, when $\lambda 1 \neq 0$ and $\lambda 2 \neq 0$ are assumed, the estimation unit 150 thereby uses regularization of the first and second terms. $\lambda 1$ and $\lambda 2$ may be previously determined according to a purpose or alternatively may be adjusted according to an actual detection result of the detection device 100.

As described above, the estimation unit 150 is able to calculate the second latent data column $\chi_m'$ and the estimated data column $v_m'$ by optimizing the objective function of FIG. 1E (in other words, by acquiring $\chi_m$ and $v_m$ which minimize the objective function) by using the regularization terms of FIG. 1F. Note here that the symbol "'" in the left side of FIG. 1E indicates a value determined by optimization.

Subsequently, the identification unit 160 identifies a sensor where a change occurred between the first data column $y_n$ and the second data column $\eta_m$ (S260). The identification unit 160 identifies, for example, the sensor 10 corresponding to a component in which the score based on the difference between the second data column $\eta_m$ and the estimated data column $v_m'$ represented by the expression of FIG. 1G is nonzero, as a sensor where a change occurred.

Instead of the score function of FIG. 1G, the identification unit 160 may use a difference between the second data column $\eta_m$ and the estimated data column $v_m'$ in each dimension d (the maximum value is D) as a score value or may use an expression in which the sum total is calculated with respect to the dimension d in the right side of FIG. 1G as a score function. The identification unit 160 may identify a sensor 10 where the score is nonzero or equal to or greater than a predetermined value as an abnormal sensor. The estimation unit 150 calculates the estimated data column $v_m'$ in which an error between data corresponding to a normal sensor and data corresponding to an abnormal sensor is made larger on the basis of the second data column $\eta_m$. Therefore, the identification unit 160 is able to identify only the abnormal sensor.

Moreover, even if the number of sensors 10 increases to exceed one hundred, for example, the detection device 100 is able to easily perform processing by increasing the dimension number D of the first data column $y_n$ and the second data column $\eta_m$ correspondingly. Therefore, the detection device 100 is able to determine only the sensors 10 falling in an abnormal signal range even if there are, for example, 100 or more sensors mutually having a complicated correlation in a physical system.

Figure 3:
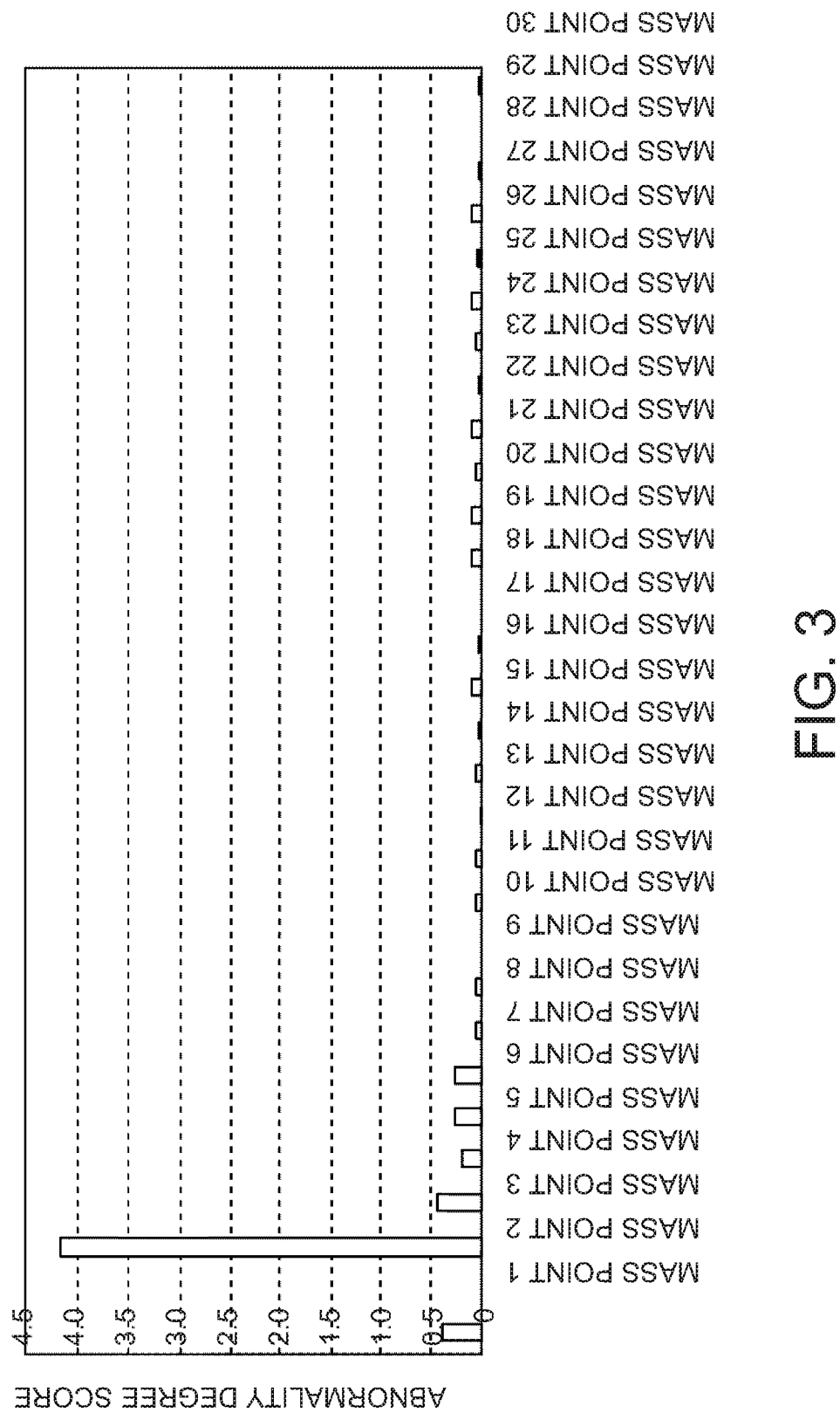
FIG. 3 is a diagram illustrating an example of a simulation result in accordance with at least one embodiment of the detection device.
Figure 4:
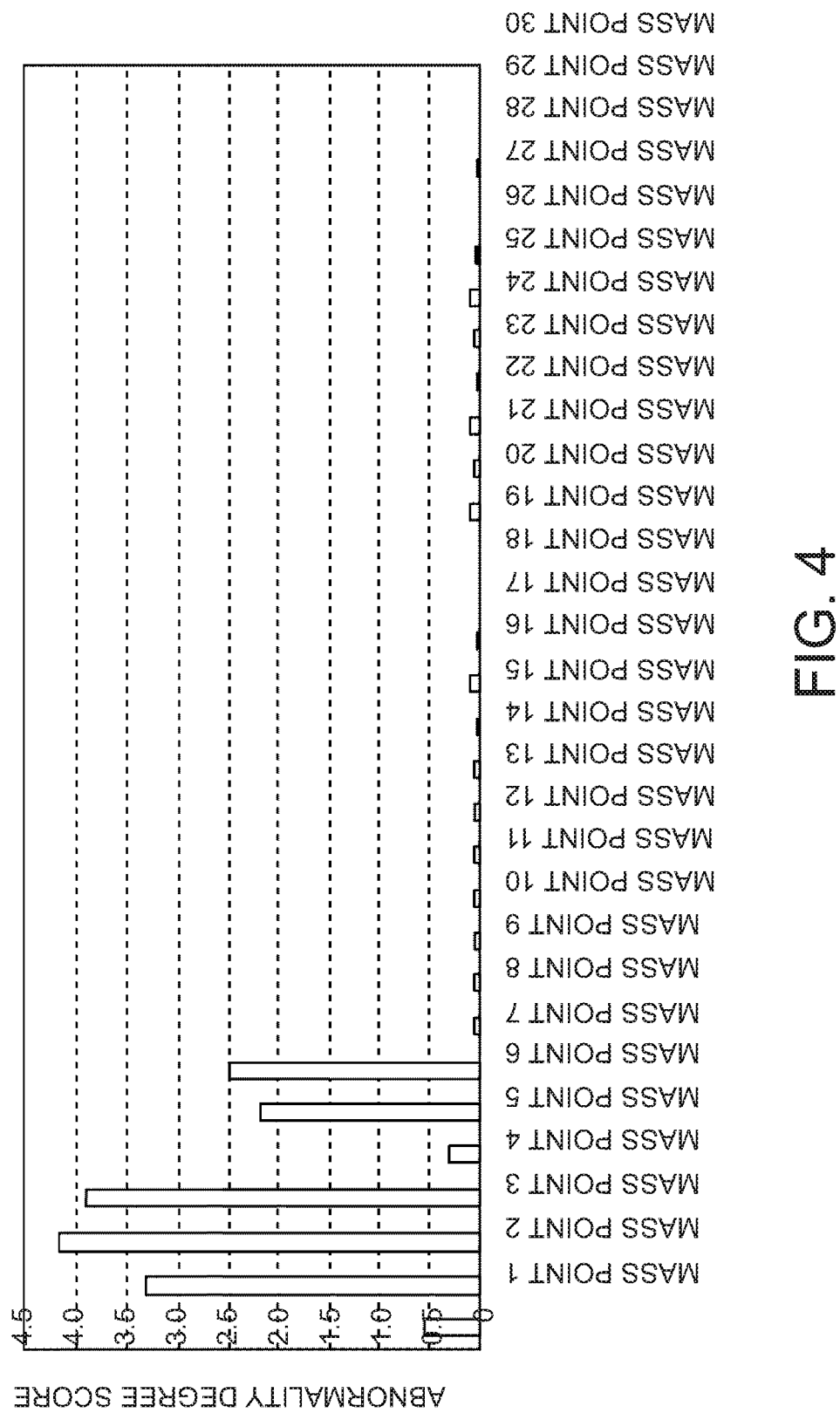
FIG. 4 is a diagram illustrating an example of a simulation result obtained by an existing detection device which calculates the scores of abnormality degrees of a plurality of sensors.

FIG. 3 illustrates an example of a simulation result obtained by the detection device 100 according to this embodiment which calculates the scores of abnormality degrees of the plurality of sensors 10. Moreover, FIG. 4 illustrates an example of a simulation result obtained by an existing detection device which calculates the scores of abnormality degrees of the sensors. FIGS. 3 and 4 each illustrate a simulation result with respect to outputs of the plurality of sensors which detect the positions of 30 mass points with respect to a physical model with the 30 mass points connected by springs. Since the plurality of mass points are connected by the plurality of springs, the positions of the respective mass points vary in a complicated manner and the corresponding sensors output detection results mutually having a complicated correlation.

The horizontal axis of FIGS. 3 and 4 represents each sensor which detects the corresponding mass point and the vertical axis represents the score value calculated so as to correspond to the sensor. Moreover, FIGS. 3 and 4 each illustrate a result of simulation in which the detection device scores the plurality of sensors in a state where only mass point 3 deviates from the normal behavior.

FIG. 3 illustrates a result of calculation by the detection device 100 according to this embodiment with respect to the scores of abnormality degrees of the plurality of sensors 10, from which it is understood that only the sensor detecting the mass point 3 outputs a score remarkably high in comparison with other sensors. Meanwhile, FIG. 4 illustrates a result of calculation by the existing detection device with respect to the scores of abnormality degrees of the sensors, which shows a result that, while the score value of the mass point 3 is high, the score values of other mass points having a strong correlation with the mass point 3 are also high.

For example, in the case of generating a prediction model from learning data, the existing detection device learns the model by using a regularization term and detects an abnormal sensor corresponding to test data by using the learned model. Therefore, if one sensor outputs abnormality and sensors having a strong correlation with this sensor also output detection results different from those of the ordinary case and then test data including those detection results are used due to the effect of the sensor concerned, the existing detection device sometimes outputs a high score value for not only the sensor concerned, but also for the sensors having the strong correlation with the sensor, as a result outside the expectation based on the learning data, as illustrated in FIG. 4.

Meanwhile, the detection device 100 according to this embodiment calculates an estimated data column by using a regularization term in a stage of reconstruction with the test data, instead of the learning stage. Therefore, in the case where one sensor outputs abnormality, the detection device 100 is able to detect that the outputs from other sensors are within the normal operations based on the test data and is able to output the score values of the sensors so that only the score value of the sensor concerned is high as illustrated in FIG. 3, even if other sensors having a strong correlation with the sensor concerned output detection results different from those of the ordinary case due to the effect of the sensor concerned.

Figure 5:
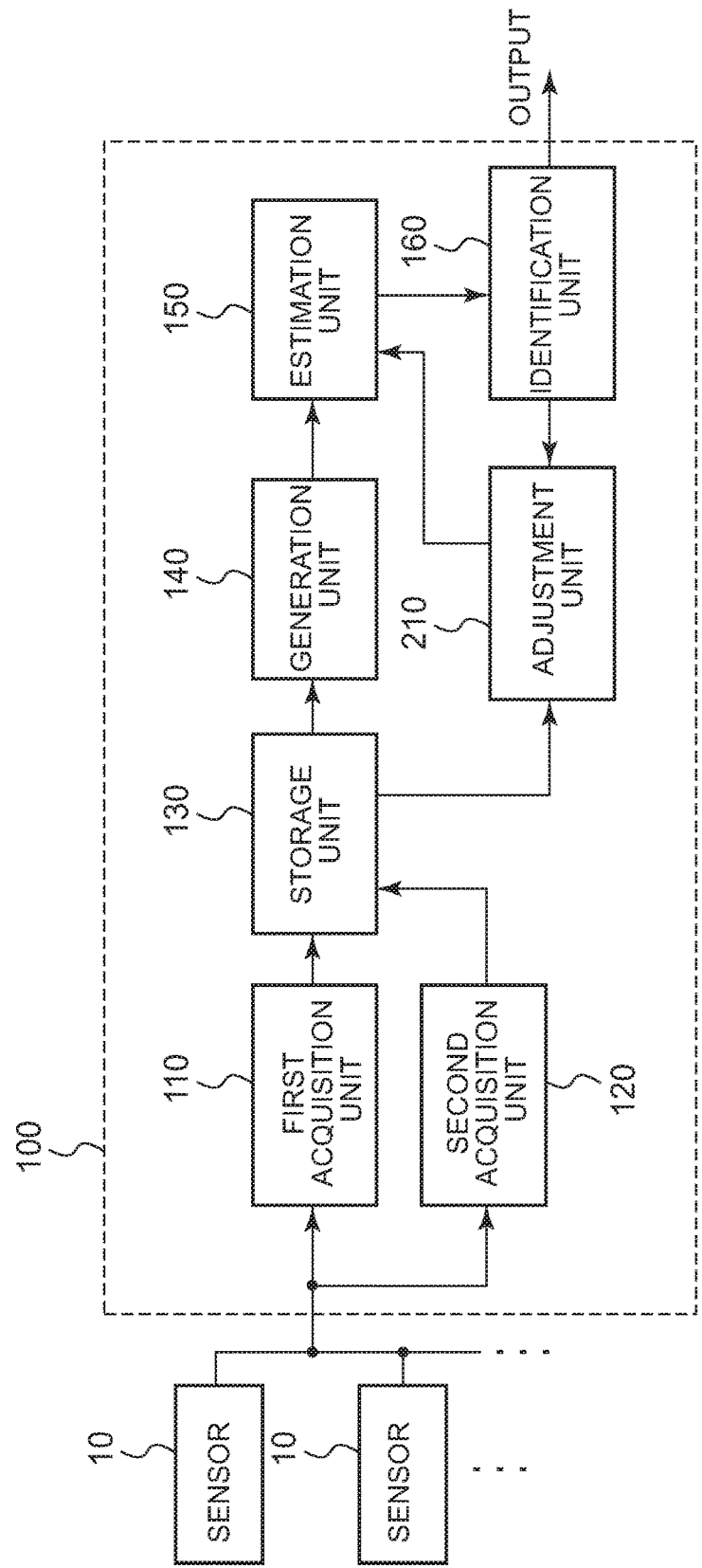
FIG. 5 is a block diagram illustrating a variation of the detection device.

FIG. 5 illustrates a variation of the detection device 100 according to this embodiment along with the plurality of sensors 10. The same reference numerals are used for the units performing substantially the same operations as those of the detection device 100 according to the embodiment illustrated in FIG. 1A in the detection device 100 of the variation and the description thereof is omitted here. The detection device 100 according to the variation further includes an adjustment unit 210.

The adjustment unit 210 is connected to the storage unit 130, the estimation unit 150, and the identification unit 160 and adjusts the weights $\lambda 1$ and $\lambda 2$ of the regularization used by the estimation unit 150 so that a sensor 10 identified by the identification unit 160 coincides with a known sensor 10 in which a change occurred. In this case, the second acquisition unit 120 acquires a second data column $\eta_m$ in which a sensor where a change occurred is known for the first data column $y_n$. Furthermore, the detection device 100 identifies an abnormal sensor by performing the operation flow of FIG. 2 on the basis of the first data column $y_n$ and the second data column $\eta_m$ and thereafter the adjustment unit 210 adjusts the values of $\lambda 1$ and $\lambda 2$ so that the identification result of the identification unit 160 corresponds to the change information of the known sensor.

The adjustment unit 210 may update the values of $\lambda 1$ and $\lambda 2$ to perform loop processing of repeating the adjustment of the values of $\lambda 1$ and $\lambda 2$ a plurality of times. In this manner, the detection device 100 according to the variation is able to adjust the weights of the regularization on the basis of an actual identification result and therefore is able to score the abnormality degrees of the sensors more accurately.

In the variation of the detection device 100 according to the embodiment, it has been described that the adjustment unit 210 adjusts the values of the weights $\lambda 1$ and $\lambda 2$ of the regularization. Alternatively or in addition to this, the adjustment unit 210 may adjust the values of the parameters $\sigma$, $\sigma x$, and $\sigma y$. This enables the detection device 100 to increase the accuracy of the scores of the sensors 10 by easily performing the parameter adjustment.

Figure 6:
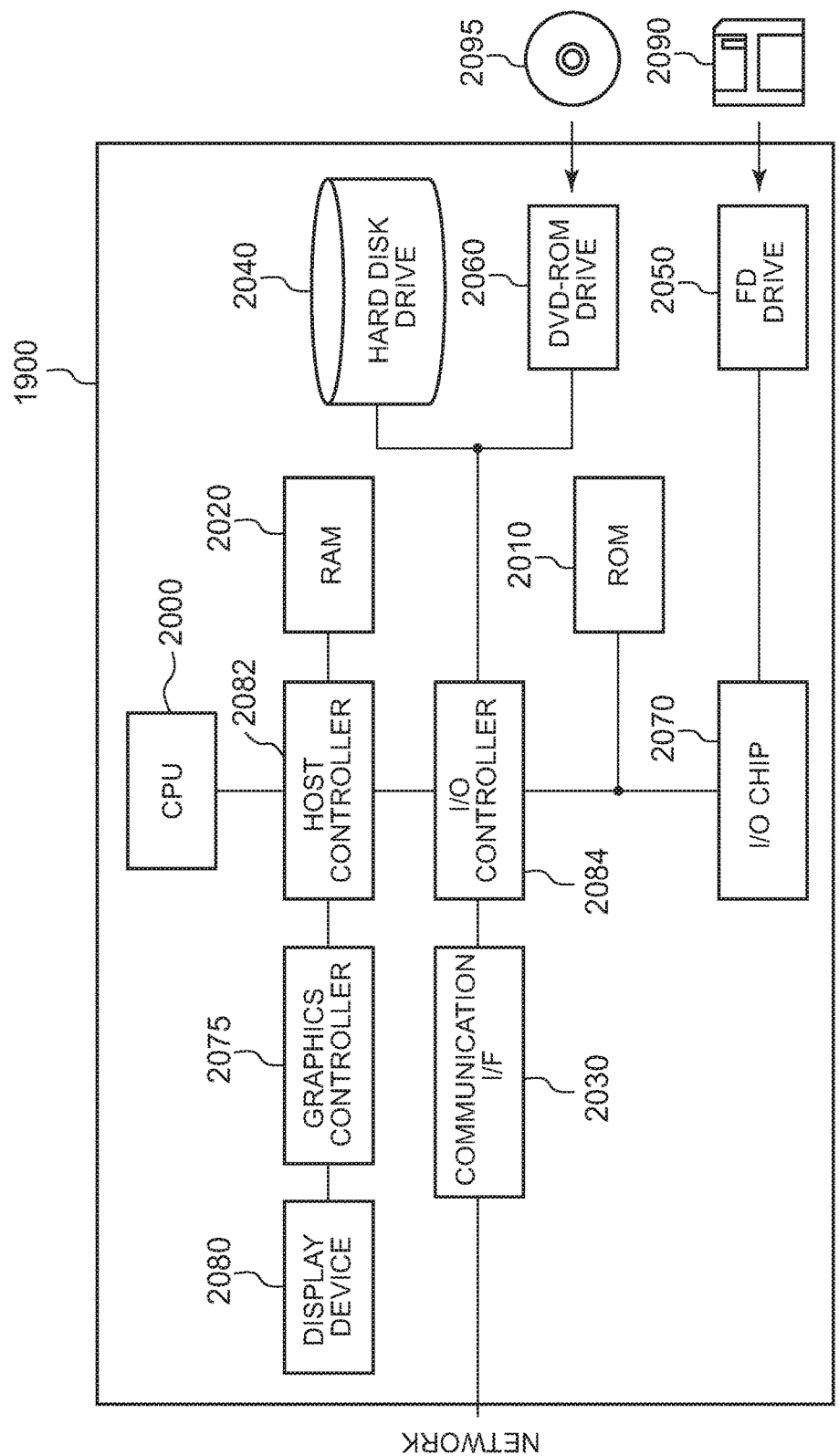
FIG. 6 is a block diagram illustrating an example of the hardware configuration of a computer in accordance with at least one embodiment of the detection device.

FIG. 6 illustrates an example of a hardware configuration of a computer 1900 which functions as the detection device 100 according to the embodiment. The computer 1900 according to the embodiment includes a CPU peripheral unit, an input/output unit, and a legacy input/output unit. The CPU peripheral unit includes a CPU 2000, a RAM 2020, and a graphics controller 2075, all of which are mutually connected to one another via a host controller 2082. The CPU peripheral unit also includes a display device 2080. The input/output unit includes a communication interface 2030, a hard disk drive 2040, and a DVD drive 2060, all of which are connected to the host controller 2082 via an input/output controller 2084. The legacy input/output unit includes a ROM 2010, a flexible disk drive 2050, and an input/output chip 2070, all of which are connected to the input/output controller 2084.

The host controller 2082 mutually connects the RAM 2020 to the CPU 2000 and the graphics controller 2075, both of which access the RAM 2020 at a high transfer rate. The CPU 2000 operates on the basis of a program stored in the ROM 2010 and the RAM 2020, and controls each of the components. The graphics controller 2075 acquires image data generated by the CPU 2000 or the like in a frame buffer provided in the RAM 2020, and causes the display device 2080 to display the acquired image data. In place of this, the graphics controller 2075 may internally include a frame buffer in which the image data generated by the CPU 2000 or the like is stored.

The input/output controller 2084 connects the host controller 2082 to the communication interface 2030, the hard disk drive 2040, and the DVD drive 2060, all of which are relatively high-speed input/output devices. The communication interface 2030 communicates with another device via a network. The hard disk drive 2040 stores, therein, a program and data to be used by the CPU 2000 in the computer 1900. The DVD drive 2060 reads a program or data from a DVD-ROM 2095 and provides the read program or data to the hard disk drive 2040 via the RAM 2020.

In addition, the input/output controller 2084 is connected to relatively low-speed input/output devices such as the ROM 2010, the flexible disk drive 2050, and the input/output chip 2070. The ROM 2010 stores a program such as a boot program executed at a start-up time of the computer 1900 and/or a program depending on hardware of the computer 1900 or the like. The flexible disk drive 2050 reads a program or data from a flexible disk 2090, and provides the read program or data to the hard disk drive 2040 via the RAM 2020. The input/output chip 2070 connects the flexible disk drive 2050 to the input/output controller 2084 and also connects various kinds of input/output devices to the input/output controller 2084 through a parallel port, a serial port, a keyboard port, a mouse port, and the like, for example.

A program to be provided to the hard disk drive 2040 via the RAM 2020 is provided by a user with the program stored in a recording medium such as the flexible disk 2090, the DVD-ROM 2095, or an IC card. The program is read from the storage medium, then installed in the hard disk drive 2040 in the computer 1900 via the RAM 2020, and executed by the CPU 2000.

The program is installed in the computer 1900 to cause the computer 1900 to function as the first acquisition unit 110, the second acquisition unit 120, the storage unit 130, the generation unit 140, the estimation unit 150, the identification unit 160, and the adjustment unit 210.

Information processes written in the programs are read by the computer 1900 and thereby functions as the first acquisition unit 110, the second acquisition unit 120, the storage unit 130, the generation unit 140, the estimation unit 150, the identification unit 160, and the adjustment unit 210, all of which are specific means resulting from cooperation of software and the aforementioned various types of hardware resources. Then, the detection device 100 specific to an intended purpose is built up by performing computation or processing of information in accordance with the intended purpose of the computer 1900 in this embodiment by use of such specific means.

In a case where communications between the computer 1900 and an external device or the like are performed, for example, the CPU 2000 executes a communication program loaded on the RAM 2020 and instructs the communication interface 2030 on the basis of processing contents described in the communication program to perform communication processing. Upon receipt of the control from the CPU 2000, the communication interface 2030 reads transmission data stored in a transmission buffer region or the like provided in a storage device such as the RAM 2020, the hard disk drive 2040, the flexible disk 2090, or the DVD-ROM 2095 and then transmits the data to a network or writes reception data received from the network into a receiving buffer region or the like provided on a storage device. As described above, the communication interface 2030 is allowed to transfer transmission and reception data between itself and a storage device by a direct memory access (DMA) scheme. Instead of this, the CPU 2000 is also allowed to read data from a storage device or a communication interface 2030 of a transfer source and then to transfer transmission and reception data by writing the data into a communication interface 2030 or a storage device of a transfer destination.

In addition, the CPU 2000 causes all or a required portion of data to be read from a file or a database stored in an external storage device such as the hard disk drive 2040, the DVD drive 2060 (DVD-ROM 2095), the flexible disk drive 2050 (flexible disk 2090) or the like into the RAM 2020 by DMA transfer or the like, and then performs various kinds of processing for the data in the RAM 2020. Then, the CPU 2000 writes the processed data back in the external storage device by DMA transfer or the like. In such processing, since the RAM 2020 can be considered as a device in which the contents of an external storage device are stored temporarily, the RAM 2020 and an external storage device or the like are collectively termed as a memory, a storage unit, a storage device, or the like in this embodiment. Various types of information including various types of programs, data, tables, databases, and the like in this embodiment are stored in such a storage device and are handled as an information processing target. It should be noted that the CPU 2000 is allowed to retain a part of data in the RAM 2020 in a cache memory and then to read and write the data in the cache memory. In this case as well, since the cache memory partially shares the function of the RAM 2020, the cache memory is considered to be included in the RAM 2020, a memory and/or a storage device except for a case where the cache memory needs to be distinguished from the RAM 2020, the memory, and/or the storage device in this embodiment.

In addition, the CPU 2000 performs, on the data read from the RAM 2020, various types of processing being specified by a sequence of instructions of the program and including various types of computations, information processing, conditional judgment, information retrieval and replacement and the like described in this embodiment, and writes the processed data back in the RAM 2020. In a case where the CPU 2000 performs conditional judgment, for example, the CPU 2000 determines by comparing a variable with the other variable or constant whether or not each of various types of variables indicated in the present embodiment satisfies a condition that the variable is larger, smaller, not less, not greater, equal, or the like. In the case where the condition is satisfied (or the condition is not satisfied), the processing of the CPU 2000 branches to a different instruction sequence or calls a subroutine.

In addition, the CPU 2000 is capable of searching for information stored in a file, a database, or the like in a storage device. For example, in a case where multiple entries having attribute values of a first attribute respectively associated with attribute values of a second attribute are stored in a storage device, the CPU 2000 searches the multiple entries stored in the storage device for an entry whose attribute value of the first attribute matches a specified condition. Then, the CPU 2000 reads an attribute value of the second attribute stored in the entry, and thereby, obtains the attribute value of the second attribute that satisfies the predetermined condition and that is associated with the first attribute.

The programs or modules described above may be stored as a computer program product on a computer readable storage medium such as an external recording medium. As the recording medium, any one of the following media may be used: an optical recording medium such as a DVD, Blu-ray®, or a CD; a magneto-optic recording medium such as an MO; a tape medium; and a semiconductor memory such as an IC card, in addition to the flexible disk 2090 and the DVD-ROM 2095. Alternatively, the program may be provided to the computer 1900 via a network, by using, as a recording medium, a storage device such as a hard disk or a RAM provided in a server system connected to a private communication network or the Internet.

The present invention has been described hereinabove with reference to preferred embodiments. The technical scope of the present invention, however, is not limited to the above-described embodiments only. It is apparent to one skilled in the art that various modifications or improvements may be made to the above-described embodiments. Accordingly, it is also apparent from the scope of the claims that the embodiments with such modifications or improvements added thereto can be included in the technical scope of the invention.

It should be noted that the operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the operation flow is described using phrases such as "first" or "next" in the claims, embodiments, or diagrams, it does not necessarily mean that the process must be performed in this order.

It should be noted that the apparatuses disclosed herein may be integrated with additional circuitry within integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An apparatus for identifying abnormal output by a sensor comprising:
a memory and a processor configured to:
measure at least one respective first output for each respective sensor of a plurality of sensors, wherein the plurality of sensors comprise at least one temperature sensor;
acquire a first data column based on the first outputs;
generate a Laplacian eigenmap latent variable model for estimating data from the plurality of sensors on the basis of the first data column;
measure at least one respective second output for each respective sensor of the plurality of sensors;
acquire a second data column based on the second outputs;
obtain an estimated data column corresponding to the second data column based on the Laplacian eigenmap latent variable model by using regularization for making an error between the second data column and the estimated data column sparse;
identify a sensor of the plurality of sensors in which a change occurred between the first data column and the second data column on the basis of the error between the second data column and the estimated data column, wherein the error between the second data column and the estimated data column for the sensor comprises a non-zero score; and
output the non-zero score and an identification of the sensor in which the change occurred.

2. The apparatus of claim 1, wherein the processor configured to obtain an estimated data column is further configured to calculate the estimated data column by using regularization in which the error between the second data column and the estimated data column is concentrated on a data column from particular sensors.

3. The apparatus of claim 2, wherein the processor configured to obtain an estimated data column is further configured to calculate the estimated data column by using regularization in which the error between the second data column and the estimated data column is concentrated on a data column from particular sensors and the error between the second data column and the estimated data column is concentrated in a time direction with respect to the particular sensors.

4. The apparatus of claim 1, wherein the processor configured to generate a Laplacian eigenmap latent variable model is further configured to calculate a first latent data column which is a latent variable data column from the first data column and generate the Laplacian eigenmap latent variable model, the Laplacian eigenmap latent variable model representing a probability distribution of latent data corresponding to respective data output from the plurality of sensors and of estimated data obtained from the latent data for the respective data, and the processor is further configured to estimate a second latent data column and the estimated data column which optimizes an objective function including a term in which the probability of taking the value of latent data in a second latent data column which is a latent variable data column of the second data column and the value of the corresponding estimated data in the estimated data column is summed up with respect to the second data column and a term for regularization.

5. The apparatus of claim 4, wherein the processor configured to generate a Laplacian eigenmap latent variable model is further configured to generate the Laplacian eigenmap latent variable model such that the Laplacian eigenmap latent variable model represents a probability distribution wherein the probability decreases as a difference between the latent data in the second latent data column and each latent data of the first latent data column increases, wherein the probability decreases as a difference between the estimated data in the estimated data column and each data of the first data column increases, and wherein the probability decreases as a difference between the data in the second data column and each data of the first data column increases.

6. The apparatus of claim 1, wherein the processor is further configured to acquire the second data column in which a sensor where a change occurred is known for the first data column, and the processor is further configured to adjust weights of regularization used by the estimation unit so that an identified sensor coincides with the known sensor in which the change occurred.

7. The apparatus of claim 1, wherein the processor is further configured to acquire the first data column for learning indicating a normal behavior of a measuring object, the processor is further configured to acquire the second data column detected from the measuring object, and the processor is further configured to identify a sensor in which abnormality is detected on the basis of an error between the second data column and the estimated data column.

8. A method for identifying abnormal output by a sensor comprising:
measuring at least one respective first output for each respective sensor of a plurality of sensors, wherein the plurality of sensors comprise at least one temperature sensor;
acquiring a first data column based on the first outputs;
generating a Laplacian eigenmap latent variable model for estimating data from the plurality of sensors on the basis of the first data column;
measuring at least one respective second output for each respective sensor of the plurality of sensors;
acquiring a second data column based on the second outputs;
obtaining an estimated data column corresponding to the second data column based on the Laplacian eigenmap latent variable model by using regularization for making an error between the second data column and the estimated data column sparse;
identifying a sensor of the plurality of sensors in which a change occurred between the first data column and the second data column on the basis of the error between the second data column and the estimated data column, wherein the error between the second data column and the estimated data column for the sensor comprises a non-zero score; and
outputting the non-zero score and an identification of the sensor in which the change occurred.

9. The method of claim 8, wherein the estimated data column is calculated by using regularization in which the error between the second data column and the estimated data column is concentrated on a data column from particular sensors.

10. The method of claim 9, wherein the estimated data column is calculated by using regularization in which the error between the second data column and the estimated data column is concentrated on a data column from particular sensors and the error between the second data column and the estimated data column is concentrated in a time direction with respect to the respective sensors.

11. The method of claim 8, further comprising:
calculating a first latent data column which is a latent variable data column from the first data column and generating the Laplacian eigenmap latent variable model representing a probability distribution of latent data corresponding to respective data output from the plurality of sensors and of estimated data obtained from the latent data for the respective data; and
estimating a second latent data column and the estimated data column which optimize an objective function including a term in which the probability of taking the value of latent data in the second latent data column which is a latent variable data column of the second data column and the value of the corresponding estimated data in the estimated data column is summed up with respect to the second data column and a term for regularization.

12. The method of claim 11, further comprising generating the Laplacian eigenmap latent variable model representing a probability distribution where the probability decreases as a difference between the latent data in the second latent data column and each latent data of the first latent data column increases, wherein the probability decreases as a difference between the estimated data in the estimated data column and each data of the first data column increases, and wherein the probability decreases as a difference between the data in the second data column and each data of the first data column increases.

13. The method of claim 8, further comprising:
acquiring the second data column in which a sensor where a change occurred is known for the first data column; and
adjusting weights of regularization so that an identified sensor coincides with the known sensor in which the change occurred.

14. The method of claim 8, further comprising:
acquiring the first data column for learning indicating a normal behavior of a measuring object;
acquiring the second data column detected from the measuring object; and
identifying a sensor in which abnormality is detected on the basis of an error between the second data column and the estimated data column.

15. A computer program product for identifying abnormal output by a sensor comprising one or more non-transitory computer readable storage media and program instructions stored on the one or more non-transitory computer readable storage media, the program instructions comprising instructions to:
  measure at least one respective first output for each respective sensor of a plurality of sensors, wherein the plurality of sensors comprise at least one temperature sensor;
  acquire a first data column based on the first outputs;
  generate a Laplacian eigenmap latent variable model for estimating data from the plurality of sensors on the basis of the first data column;
  measure at least one respective second output for each respective sensor of the plurality of sensors;
  acquire a second data column based on the second outputs;
  obtain an estimated data column corresponding to the second data column based on the Laplacian eigenmap latent variable model by using regularization for making an error between the second data column and the estimated data column sparse;
  identify a sensor of the plurality of sensors in which a change occurred between the first data column and the second data column on the basis of the error between the second data column and the estimated data column, wherein the error between the second data column and the estimated data column for the sensor comprises a non-zero score; and
  output the non-zero score and an identification of the sensor in which the change occurred.

16. The computer program product of claim 15, wherein the estimated data column is calculated by using regularization in which the error between the second data column and the estimated data column is concentrated on a data column from particular sensors.

17. The computer program product of claim 16, wherein the estimated data column is calculated by using regularization in which the error between the second data column and the estimated data column is concentrated on a data column from particular sensors and the error between the second data column and the estimated data column is concentrated in a time direction with respect to the respective sensors.

18. The computer program product of claim 15, wherein the program instructions comprise instructions to:
  calculate a first latent data column which is a latent variable data column from the first data column and generating the Laplacian eigenmap latent variable model representing a probability distribution of latent data corresponding to respective data output from the plurality of sensors and of estimated data obtained from the latent data for the respective data; and
  estimate the second latent data column and the estimated data column which optimize an objective function including a term in which the probability of taking the value of latent data in the second latent data column which is a latent variable data column of the second data column and the value of the corresponding estimated data in the estimated data column is summed up with respect to the second data column and a term for regularization.

19. The computer program product of claim 18, wherein the program instructions comprise instructions to generate the Laplacian eigenmap latent variable model representing a probability distribution wherein the probability decreases as a difference between the latent data in the second latent data column and each latent data of the first latent data column increases, wherein the probability decreases as a difference between the estimated data in the estimated data column and each data of the first data column increases, and wherein the probability decreases as a difference between the data in the second data column and each data of the first data column increases.

20. The computer program product of claim 15, wherein the program instructions comprise instructions to:
  acquire the second data column in which a sensor where a change occurred is known for the first data column; and
  adjust weights of regularization so that an identified sensor coincides with the known sensor in which the change occurred.

* * * * *